United States Patent [19]
Ono

[11] Patent Number: 5,662,461
[45] Date of Patent: Sep. 2, 1997

[54] DUAL PISTON PUMP WITH MAGNETICALLY ACTUATED PISTONS

[76] Inventor: Harry Ono, c/o Coax, Inc. 1890 Big Bend Dr., Des Plaines, Ill. 60016

[21] Appl. No.: 656,079

[22] Filed: May 31, 1996

Related U.S. Application Data

[63] Continuation of Ser. No. 332,092, Oct. 31, 1994, abandoned.

[51] Int. Cl.$^6$ .................................................. F04B 17/04
[52] U.S. Cl. ..................... 417/418; 417/417; 417/553
[58] Field of Search ........................... 417/417, 418, 417/553, 523

[56] References Cited

U.S. PATENT DOCUMENTS

| | | |
|---|---|---|
| 2,533,164 | 12/1950 | Dickey et al. . |
| 2,669,186 | 2/1954 | Parker ........................ 417/418 |
| 2,832,291 | 4/1958 | Gorsko . |
| 2,833,221 | 5/1958 | Dickey . |
| 3,103,603 | 9/1963 | Reutter ........................ 417/418 |
| 3,267,866 | 8/1966 | Unger . |
| 3,302,582 | 2/1967 | Kofink . |
| 3,380,387 | 4/1968 | Kofink ........................ 417/417 |
| 3,384,021 | 5/1968 | Perron . |
| 3,791,771 | 2/1974 | Roesel, Jr. .................. 417/418 |
| 3,842,809 | 10/1974 | King .......................... 417/417 |
| 4,047,852 | 9/1977 | O'Conner et al. ........... 417/417 |
| 4,150,924 | 4/1979 | Toyoda . |
| 4,169,696 | 10/1979 | Brown . |
| 4,272,225 | 6/1981 | Fujinaka et al. . |
| 4,352,645 | 10/1982 | Meyer . |
| 4,568,249 | 2/1986 | Todd . |
| 4,568,250 | 2/1986 | Falk et al. . |
| 5,073,095 | 12/1991 | Thomas, Sr. . |

FOREIGN PATENT DOCUMENTS

| | | | |
|---|---|---|---|
| 1159569 | 6/1958 | France ........................ 417/417 |
| 164786 | 12/1980 | Japan ......................... 417/417 |
| 0223685 | 9/1990 | Japan ......................... 417/418 |
| 403253778 | 11/1991 | Japan ......................... 417/417 |
| 630443 | 6/1982 | Switzerland ................. 417/418 |
| 1608358 | 11/1990 | U.S.S.R. ..................... 417/417 |
| 2209628 | 5/1989 | United Kingdom ........... 417/417 |

*Primary Examiner*—Timothy Thorpe
*Assistant Examiner*—Ted Kim
*Attorney, Agent, or Firm*—Hill, Steadman & Simpson

[57] ABSTRACT

A hydraulic pump has a magnetic tube and two floating pistons within the tube, adapted to be moved in an axial direction within the tube as a result of magnetic flux generated by an electric coil surrounding the tube. Each piston has a valve for allowing fluid flow in one direction through the tube, and spring means acts on the pistons to control their positions. The arrangement allows operation with reduced vibration and pressure fluctuation, less heat and impact during dry running operation, and less heat and impact during high pressure shut-off.

10 Claims, 3 Drawing Sheets

100 lbs FORCE ON BASE

MAGNETIC FORCE

DUAL PISTON PUMP WITH MAGNETICALLY ACTUATED PISTONS

This is a continuation, of application Ser. No. 08/332,092 filed Oct. 31, 1994, now abandoned.

BACKGROUND

This invention relates to a fluid pump, and more particularly to a fluid pump having a double piston. Currently available fluid pumps are subject to various deficiencies.

SUMMARY OF THE INVENTION

The deficiencies are significant enough to limit pumps of this type to small sizes with output capacities of either low volume at high pressures or high pressures at low volume. Typically the pump size is about 2½ inches square with a length of 6 inches overall. The output ranges from 1/20 gallons per minute at 30 psi to ½ gpm at 5 psi.

The undesirable characteristics are:
1. noise
2. pressure fluctuations
3. vibration of the pump
4. heating, if run dry and/or if left running with the output closed
5. piston impact and damage, if run dry
6. inefficient output with the output to input energy ratios in the order of 1%.

Accordingly, it is a principal object of this invention to provide an efficient, magnetic piston, fluid pump that eliminates the deficiencies contained in the pumps of this type, as presently available.

In accordance with an embodiment of the invention, there is provided a magnetic pump construction having double floating pistons, a first spring bearing against one of the pistons, a second axially adjustable spring for limiting the stroke of the motions and to store kinetic energy, and a throttle valve to limit the stroke of the piston.

A pump constructed in this manner has superior performance in comparison with presently available pumps.

These and other objects and advantages of the present invention will become manifest upon an inspection of the following description and the accompanying drawings.

BRIEF DESCRIPTION OF THE DRAWINGS

Reference will now be made to the accompanying drawings, in which.

DESCRIPTION OF THE PREFERRED EMBODIMENT

Figure 1:
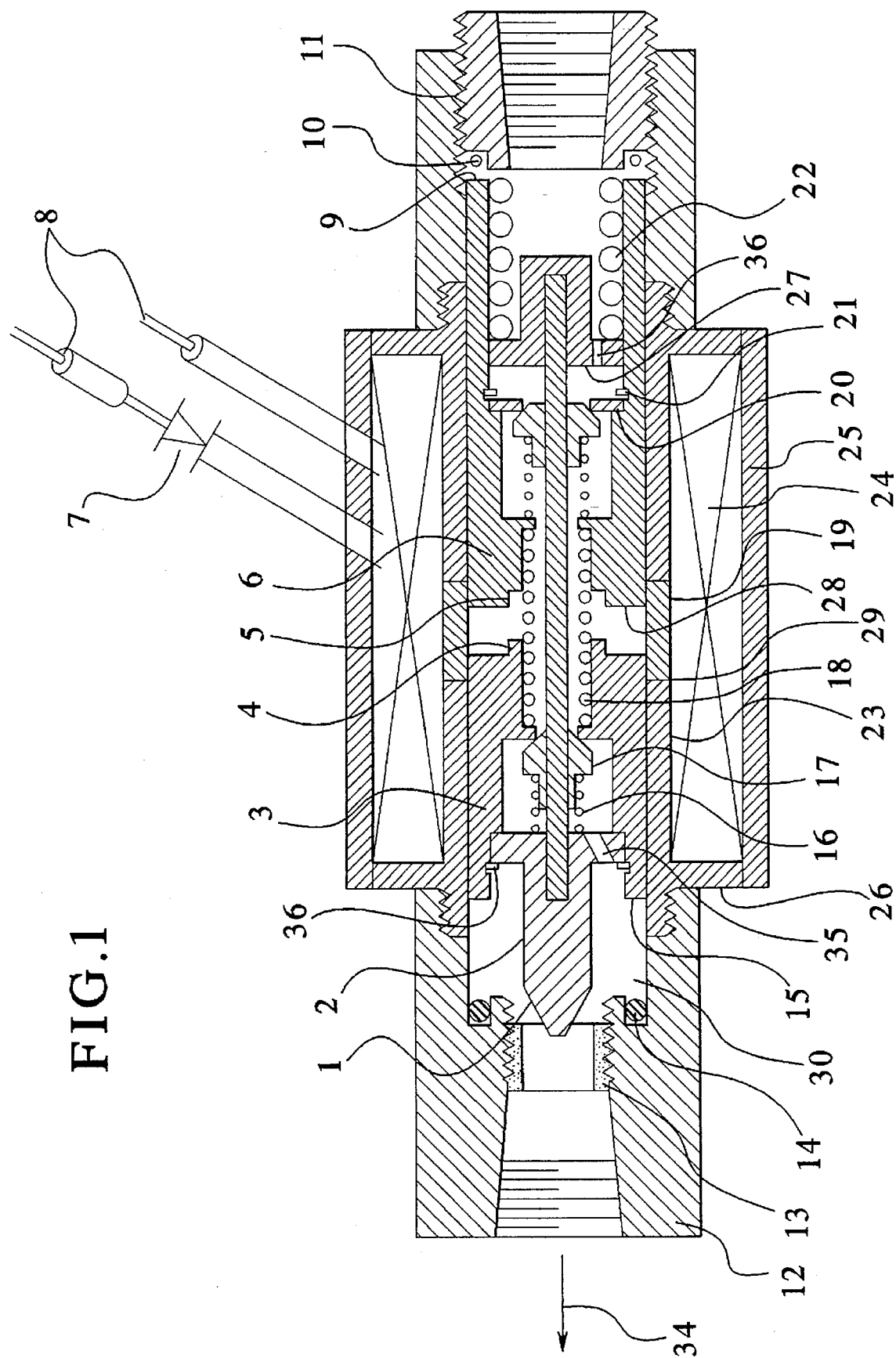
FIG. 1 is a longitudinal cross-sectional view of a pump constructed in accordance with an illustrative embodiment of the present invention.

FIG. 1 is a cross-sectional view of this invention, which also illustrates the basic components of this type of pump. Magnetic material pistons 3 and 6 oscillate within the magnetic material tube 23, which is split in the middle and connected with an non magnetic material tube 19. To complete the magnetic path, the tubes contain flanges 26 and an outer tube 25. The electrical winding 24 is circumferential and an AC voltage is applied through wires 8.

One wire contains a diode 7 which rectifies the sine wave. The half wave input creates a magnetic force, very roughly half of the time, which pulls the pistons 3 and 6 together, then allows the spring 18 to separate the pistons the other half of the cycle.

The new design consists of two floating pistons, whereas pumps presently sold have one or the other piston firmly attached to the tube.

Figure 2:
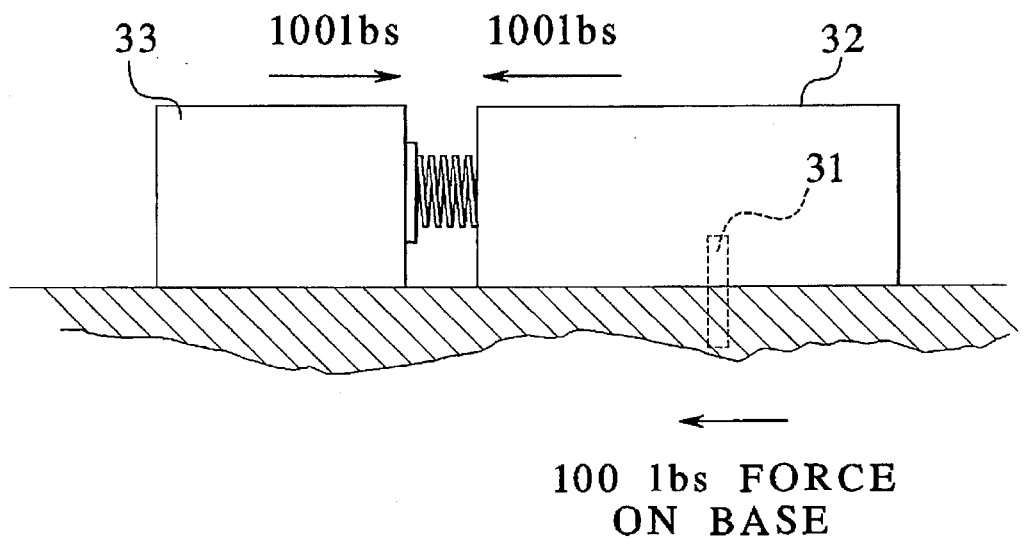
FIG. 2 is a diagrammatic illustration to explain the vibration which characterizes the currently available pumps.

When one piston is rigidly attached to the tube, the full force of the magnet and spring is transmitted to the housing, which causes a substantial vibration and sound as illustrated in FIG. 2.

If the pin 31 of FIG. 2 is removed, the 100 lb. force would react between the two blocks 32 and 33 and there would be no force (except friction) transmitted to the base.

Also, if only one piston oscillates, one half of the cycle pressurizes the fluid and the other half refills the chamber with a suction, causing a large output pressure fluctuation.

A pump with dual pistons can be modified with small but significant changes to provide various outputs such as:
constant pressures (or adjustable constant pressure)
constant volume (or adjustable constant volume)
constant volume and/or pressure with fluctuating input voltages
a pressure/volume characteristics tailored for specific applications.

FIG. 1 illustrates the details of an illustrative embodiment of the invention. It has the foregoing functions, plus impact eliminating damping, and dry running and high pressure shut off capabilities. Also, by positioning the large spring 22 behind the piston 6 the face area of both pistons can be maximized for the maximum magnetic pull together force, which equates to maximum pressures.

In operation, the magnetic force pulls together pistons 3 and 6, which causes the fluid between the two pistons to flow in the direction indicated by the arrow 34 due to the poppet valves 17. If there are no restrictions in the output connections, the spring 22 will push both pistons in the direction of the arrow 34 until the flange 15 contacts the "0" ring bumper 14. Rod end cap 2 is retained within the bore of piston 3 with a snap ring 36. Axial holes 35 and 36 are provided in the rod end caps 2 and 27 for the free flow of liquid through the pump.

There are three conditions encountered when this pump is used.
1. A steady state normal operation, where the pump has a sufficient supply of fluid, and pumps against the normal pressure outlet.
2. Dry running during start up or when the supply of fluid is exhausted and air enters the system.
3. High pressure blockage when the output flow is shut off with the pump energized.

Assuming that there is a sufficient restriction down stream of the pump to generate an internal fluid pressure that is great enough to press against the piston 3 and slightly compresses the spring 22,then the action when the pistons close together causes some fluid to flow out of the pump and the remainder to accumulate, under pressure (due to spring 22), behind the piston 3.

When the magnetic force drops to zero, the spring 18 separates both pistons but the flow continues because the spring 22 is constantly pushing piston 3 in the direction of the fluid flow. During this time interval, piston 6 is accelerated to the right by the spring 18.

At some time interval before the piston 3 reaches the end of its "free to move" stroke, the magnetic force is applied again, due to the alternating current input.

The piston 6 is normally pushed to the right until the surface 9 impacts the stiff, wavy, spring washer 10. These piston motions refill the space between the two pistons in preparation for the next cycle.

The piston 6, moves to the right with enough velocity to cause an annoying external vibration. Therefore, the piston diameter at the end 9 is dimensioned to provide a hydraulic damping action with the cavity of the wavy spring 10. The wavy spring 10 is compressed, then pushes the piston in the opposite direction, which conserves most of the kinetic energy of the piston 6. Since the oscillation timing must be adjusted accurately, a threaded insert 11 is used for this calibration.

Figure 3:
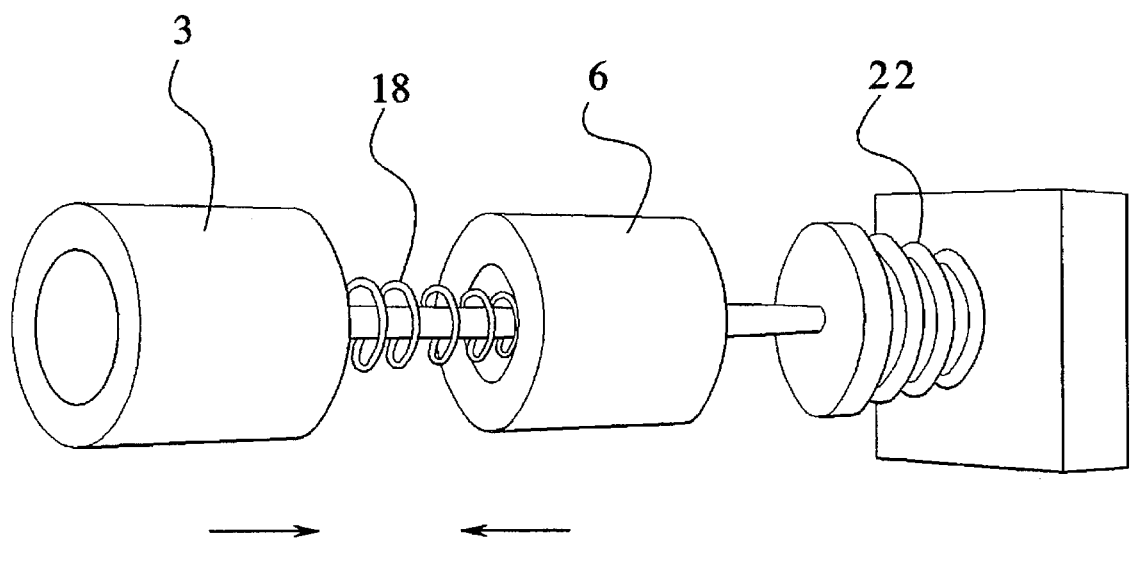
FIG. 3 is a perspective view of a simplified version of the apparatus of FIG. 1.
Figure 4:
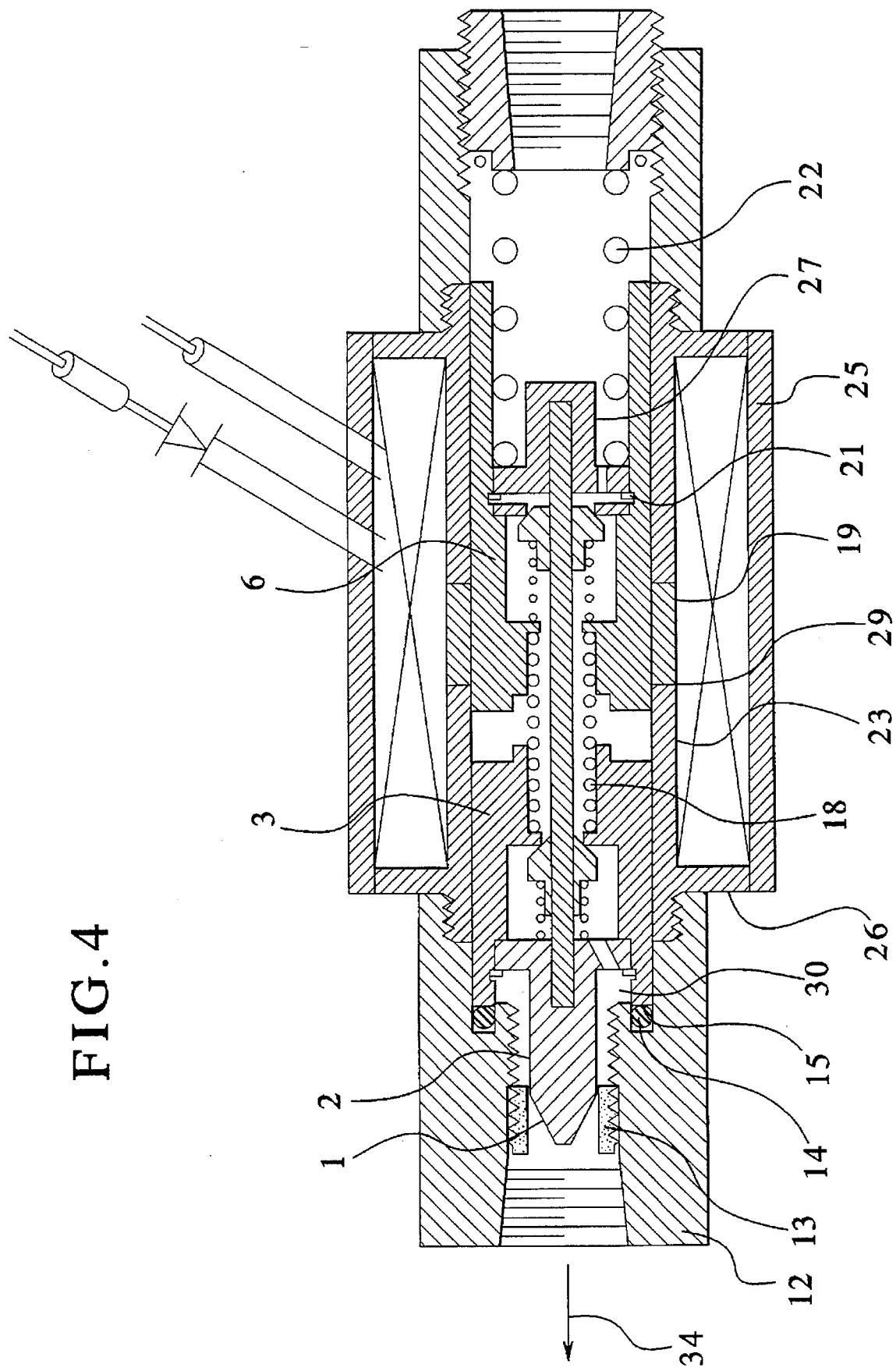
FIG. 4 is an illustration of the apparatus of FIG. 1 in a dry running condition.

FIG. 3 illustrates the dynamics described above. The magnetic force pulls the pistons together, causing the fluid to flow to the left. Approximately half of the fluid flows out of the pump, and the other half accumulates behind the piston 3 and pushes the piston against the spring 22. At this instant, piston 3 acts as an accumulator end also as a piston returning to its refill position.

When the magnetic force is released, a continued flow (and pressure) is created by the spring 22, acting on piston 3. The spring 18 pushes piston 6 back to its normal refill, starting position. The action of both pistons contributes to a smooth steady flow with little external vibration.

The copper windings generate heat which must be dissipated. During normal operation, the fluid passing through the pump dissipates the heat generated by the wires. Since this pump is basically a high induction device, the current flow varies widely depending on whether the pistons are open or closed.

When the pump is run without any fluid, this is commonly known as dry running. Dry running this pump is normally detrimental due to heating and also due to impact damage due to the high forces applied to the pistons. These problems can be eliminated by reducing the magnetic and spring forces with a smaller electrical current input and also by limiting the air gap between the two pistons. These corrections degrade the output potential and limit the pump to a low performance category. The corrections for the heating and impact damage are accomplished by the following measures in this invention.

With no fluid in the pump, the spring 18 pushes the piston 6 against the rod and cap 27, up to where the snap ring 21 contacts the cap 27. Simultaneously, the spring 22 pushes both pistons to the left, up to the point where the piston end 15 presses against the 0 ring 14.

In this position, the front surface 28 of piston 6 is in line with the magnetic tube edge 29. This position of piston 6 provides a good magnetic circuit for the flux, which reduces the current (and heating) through the windings and provides a small oscillation of piston 6 which is not great enough to cause impact of both pistons, but large enough to prime the pump and initiate normal operation. When the pump fills with fluid and the pressure builds up, both pistons rapidly move to the right, the oscillation force and amplitude increases, and a normal operation resumes.

The electric current measurements of an illustrative embodiment are about as follows:

Current with pistons closed - 1 amp

Current with pistons open with a ⅛ inch gap - 2 a.

Current with pistons in idle position -1.5 a.

Normal running current 2 a.

The third condition normally encountered in use is a high pressure shut off. In FIG. 3, if the output of the pump is completely blocked, pistons 3 and 6 will always close, when power is applied, and stay closed as long as the pressure from the magnetic force is greater than the spring force, since both pistons are free to oscillate.

If the pistons are locked together due to an output blockage, the magnetic circuit has a minimum reluctance and consequently a minimum current flow through the coils.

On present pumps, only one moving piston is normally provided. A magnetic material insert, functioning as part of the frame is provided, and functions as a stationary piston.

If piston 3 is firmly attached to the cylinder as in present designs, the magnetic force pulls piston 6 in the flow direction. Therefore, the magnetic force provides the pressure and flow. With this arrangement the piston 6 oscillates freely during dry run operation, and the current drops swiftly as compared to a full output run, and the impact in both directions occurs with maximum force. A high pressure shut off prevents piston 6 from moving, which creates a large air gap and maximizes the electric current.

If piston 6 is firmly attached to the cylinder as in present designs, the magnetic force pulls piston 3 in the "refill" direction. The spring 22 provides the flow pressure and displacement. During dry run operation, with a fixed piston, the same detrimental conditions exist as described above, with a firmly attached piston. When a high pressure shut off occurs, the pistons close together for a beneficial effect in the same manner as the present invention.

|  | Vibration Pressure Fluctuation | Dry Run | High Press Shut-off | For pumps/approx. the same size Maximum output - Pressure × Volume |
| --- | --- | --- | --- | --- |
| New Invention | Low | No impact Heat = ½ normal | No Impact Heat = ½ normal | 36 watts |
| Left piston 3 | Large | Impact Heat = 75% normal | Piston open Heat = 2 × normal | * 0.3 to 2 watts |
| Right piston 6 | Large | Impact Heat = 75% normal | Piston closed Heat = ½ normal | * 0.3 to 2 watts |

* output limited mostly due to impact and noise

For a constant pressure pump, the spring 22 is required to be moderately strong and long, assembled into the pump with a lot of pre-compression. The long pre-compression will provide a relatively constant spring force throughout the normal stoke of the piston 3.

For a constant volume pump, the rod end cap 2 is extended and tapered on the point. A throttle orifice insert 13 is threaded into the end cap 12. This insert has an inside diameter that has a small clearance to the rod end cap 2. In normal operation, the piston 3 stroke is limited by the fluid becoming trapped in the space 30 due to the outlet being closed. This assures a constant volume pumped on each stroke.

The shut off valve action also provides another important function. The flowing fluid has sufficient inertia throughout the system to continue a flow through even after the piston reverses direction. The back pressure decelerates the fluid to a stop when the pumping pressure decreases. The flow through volume varies depending on the outlet pressure. Therefore, the flow rate is much more constant if the flow is brought to a complete stop on each cycle. Liquids being pumped cannot be stopped instantly, and therefore, to avoid impacting the fluid and pump, a taper 1 is provided. This allows all parts to decelerate to a stop. The output volume can be varied by changing the position of the insert 13.

To eliminate impact of the pistons 3 and 6, a small projection 4 is provided on piston 3. This projection telescopes into the close fitting bore 5 of piston 6 which traps the fluid between the 2 pistons which in turn provides a dampened deceleration of both pistons.

The significant details of the invention are listed below in the approximate order of importance:

1. double floating pistons;
2. when run dry, means to shift the piston 3 into a position which provides a better magnetic path and consequentially a reduced heat; and piston impact.
3. a strong spring positioned on the opposite side of the magnetic interface and applying its force to the piston through a rigid member, through the interface and on to the piston on the far end;
4. provision for fluid damping at the end of oscillations;
5. an axially adjustable, strong, impact spring to limit the stroke and also recover the piston kinetic energy;
6. a throttle valve for limiting the piston stroke and/or stopping the fluid flow.

We claim:

1. A hydraulic pump comprising, in combination:

a tube, a pair of pistons comprising an upstream piston and a downstream piston, both of said pistons being formed of magnetic material and freely slidably disposed within said tube, connector means connected to said downstream piston and extending through an aperture in said upstream piston, magnetic means for selectively generating magnetic flux to urge said pistons together, each of said pistons having valve means for supporting the fluid flow in one direction through said tube, and first spring means disposed within the tube and connected said connector means for urging said downstream piston toward a downstream direction of said flow, and second spring means between said pistons for urging them apart.

2. The pump according to claim 1, including an electrical winding for generating magnetic flux therein when said winding is supplied with an electric current.

3. The pump according to claim 1, wherein said tube is composed of two axially aligned magnetic tube, said parts being separated by a nonmagnetic tube.

4. The pump according to claim 1, wherein said first spring means comprises a coil spring axially aligned with said tube, and adjustable means abutting one end of said coil spring for adjustably precompressing said coil spring.

5. The pump according to claim 1, including a throttle valve for limiting the stroke of at least one of said pistons.

6. The pump according to claim 1, including a throttle valve for stopping fluid flow through said pump.

7. The pump according to claim 1 including second spring means interposed between said pistons, said second spring means adapted to force said pistons apart except when said magnetic flux is applied.

8. The pump according to claim 1, including a normally open cavity adjacent one end of at least one of said pistons for hydraulic damping movement of said piston.

9. The pump according to claim 1 wherein said tube is formed of two sections of magnetic material joined by a section of non-magnetic material, and including means to shift the position of at least one of said pistons toward said downstream direction to a position adjacent to said section of non-magnetic material when the pump is run dry, to alter the magnetic flux path by allowing flux to flow through said one piston between said magnetic sections of said tube.

10. The pump according to claim 1, wherein said spring is a compression spring positioned on the intake side of both pistons and including a rod connected to the downstream piston, said rod extending through the upstream piston.

* * * * *